(12) United States Patent
Gutierrez Cuevas et al.

(10) Patent No.: US 12,055,810 B2
(45) Date of Patent: Aug. 6, 2024

(54) ENHANCED DEFECT DETECTION WITH PLANAR MACROCYCLE DYES IN LIQUID-CRYSTAL FILMS

(71) Applicant: Orbotech Ltd., Yavne (IL)

(72) Inventors: Karla G. Gutierrez Cuevas, San Jose, CA (US); Jason Reid, San Jose, CA (US); Nungavaram Viswanathan, San Jose, CA (US)

(73) Assignee: Orbotech Ltd., Yavne (IL)

( * ) Notice: Subject to any disclaimer, the term of this patent is extended or adjusted under 35 U.S.C. 154(b) by 0 days.

(21) Appl. No.: 18/238,183

(22) Filed: Aug. 25, 2023

(65) Prior Publication Data

US 2024/0094576 A1 Mar. 21, 2024

Related U.S. Application Data

(60) Provisional application No. 63/402,079, filed on Aug. 30, 2022.

(51) Int. Cl.
| | |
|---|---|
| *G02F 1/1334* | (2006.01) |
| *C09B 47/04* | (2006.01) |
| *C09B 67/20* | (2006.01) |
| *C09K 19/02* | (2006.01) |
| *C09K 19/54* | (2006.01) |
| *C09K 19/60* | (2006.01) |

(Continued)

(52) U.S. Cl.
CPC ............ *G02F 1/1334* (2013.01); *C09B 47/04* (2013.01); *C09B 67/0069* (2013.01); *C09K 19/0225* (2013.01); *C09K 19/0275* (2013.01); *C09K 19/542* (2013.01); *C09K 19/60* (2013.01); *G02F 1/133302* (2021.01); *G02F 1/137* (2013.01); *C09K 2019/546* (2013.01); *G02F 2202/04* (2013.01)

(58) Field of Classification Search
CPC .............................. C09B 47/04; G02F 1/1334
USPC .............................................................. 349/1
See application file for complete search history.

(56) References Cited

U.S. PATENT DOCUMENTS

| | | |
|---|---|---|
| 7,639,319 B2 | 12/2009 | Chen |
| 7,817,333 B2 | 10/2010 | Chen |

(Continued)

FOREIGN PATENT DOCUMENTS

| | | |
|---|---|---|
| CN | 1227838 A | 9/1999 |
| CN | 104726107 A | 6/2015 |

(Continued)

OTHER PUBLICATIONS

Kizhakidathazhath et al., "High-Performance Polymer Dispersed Liquid Crystal Enabled by Uniquely Designed Acrylate Monomer," Polymers, Jul. 22, 2020, 1625, 12(8).

(Continued)

*Primary Examiner* — Christopher M Raabe
(74) *Attorney, Agent, or Firm* — Hodgson Russ LLP

(57) ABSTRACT

A modulator material layer includes a polymer matrix formed of a plurality of cross-linked polymer molecules and a plurality of droplets of liquid crystals within the polymer matrix. A planar macrocycle dye is dispersed within the plurality of droplets of liquid crystals. The planar macrocycle dye can include one or more of a phthalocanine, a porphyrin, a naphthalocyanine, a metallophthalocyanine, a metalloporphyrin, or a metallonaphthalocyanine.

20 Claims, 5 Drawing Sheets

(51) Int. Cl.
*G02F 1/1333* (2006.01)
*G02F 1/137* (2006.01)

(56) References Cited

U.S. PATENT DOCUMENTS

| | | |
|---|---|---|
| 8,801,964 B2 | 8/2014 | Chen |
| 8,992,796 B2 | 3/2015 | Hasebe et al. |
| 2006/0134349 A1 | 6/2006 | Chari et al. |
| 2006/0170853 A1 | 8/2006 | Jeong et al. |
| 2012/0162596 A1 | 6/2012 | Chen |
| 2015/0275090 A1 | 10/2015 | Wang |

FOREIGN PATENT DOCUMENTS

| | | | |
|---|---|---|---|
| CN | 109307966 A | | 2/2019 |
| CN | 109897644 A | | 6/2019 |
| CN | 110092875 A | | 8/2019 |
| CN | 110229677 A | | 9/2019 |
| CN | 110256810 A | | 9/2019 |
| CN | 110862829 A | | 3/2020 |
| CN | 113736010 A | * | 12/2021 |
| EP | 0452460 A1 | | 10/1991 |
| IN | 105906762 A | | 8/2016 |
| JP | H047518 A | | 1/1992 |
| JP | 2002275471 A | | 9/2002 |
| JP | 2018180536 A | | 11/2018 |
| WO | 2024042362 A1 | | 2/2024 |

OTHER PUBLICATIONS

Mrukiewicz et al., "Threshold voltage decrease in a thermotropic nematic liquid crystal doped with graphene oxide flakes," Beilstein Journal of Nanotechnology, 2019, 71-78, 10.

WIPO, International Search Report and Written Opinion for International Application No. PCT/IB2023/000516, Jan. 30, 2024.

Chen et al., In the United States Patent and Trademark Office, Application for Patent for Paraffinic Compound Addition to Liquid Crystals for Reduced Switching Voltage on NCAP-Based Electro-Optical Modulator, U.S. Appl. No. 18/208,553, Jun. 12, 2023.

* cited by examiner

ENHANCED DEFECT DETECTION WITH PLANAR MACROCYCLE DYES IN LIQUID-CRYSTAL FILMS

CROSS-REFERENCE TO RELATED APPLICATIONS

This application claims priority to the provisional patent application filed Aug. 30, 2022 and assigned U.S. App. No. 63/402,079, the disclosure of which is hereby incorporated by reference.

FIELD OF THE DISCLOSURE

This disclosure relates to electro-optics and, more particularly, to macrocycle dye doping in liquid crystal materials to enhance defect detection in electro-optic applications.

BACKGROUND OF THE DISCLOSURE

Electro-optic modulators using liquid crystals, particularly nematic curvilinear aligned phases (NCAP) films or polymer dispersed liquid crystal (PDLC) films, for modulation are used to test conduction of thin-film transistors and interconnects of flat panel displays (FPD) under fabrication. Enhancement on defect detection is encouraged to resolve smaller defects on FPDs in a fast manner. Existing modulators had a limit on defect detection capability and low sensitivity. Therefore, it would be advantageous to provide a device, system, or method that can improve some of the shortcomings described above. Systems and techniques that enhance the defect detection using modulators and the modulator's sensitivity (s-curve) used in the array checker are needed.

BRIEF SUMMARY OF THE DISCLOSURE

A modulator material layer is provided in a first embodiment. The modulator material layer includes a polymer matrix formed of a plurality of cross-linked polymer molecules; a plurality of droplets of liquid crystals within the polymer matrix; and a planar macrocycle dye dispersed within the plurality of droplets of liquid crystals. The planar macrocycle dye can include one or more of a phthalocanine, a porphyrin, a naphthalocyanine, a metallophthalocyanine, a metalloporphyrin, or a metallonaphthalocyanine. In an instance, the planar macrocycle dye includes one or more of a phthalocanine, a porphyrin, or a naphthalocyanine. In another instance, the planar macrocycle dye includes one or more of a metallophthalocyanine, a metalloporphyrin, or a metallonaphthalocyanine. For example, the planar macrocycle dye may be zinc phthalocyanine.

The planar macrocycle dye may be from 0.002 to 0.5 wt % of a mixture of the polymer matrix, the liquid crystals, and the planar macrocycle dye.

The modulator material layer can be a nematic curvilinear aligned phases (NCAP) film. The modulator material layer also can be a polymer dispersed liquid crystal (PDLC) film, a chiral liquid crystal film, a ferroelectric liquid crystal film, or a Blue Phase liquid crystal film.

The droplets may range in size from 0.1 to 10 microns.

The liquid crystals can be randomly oriented within the plurality of droplets when no electric field is present. The liquid crystals can at least partially align along a direction of an electric field when the electric field is applied across the modulator material layer.

The modulator material layer can further include a transparent conductive film disposed on the modulator material layer.

The modulator material layer can further include a glass substrate. The modulator material layer is one of a direct coating on the glass substrate or a lamination on the glass substrate.

An imaging system is provided in a second embodiment. The imaging system includes an illumination source configured to generate illumination; a stage configured to hold a sample; a detector to generate an image of at least a portion of the sample; and an electro-optic modulator disposed in a path of illumination from the illumination source and separated from the sample by an air gap. The electro-optic modulator includes a transparent conductive film and a modulator material layer disposed on the transparent conductive film. The modulator material layer includes a polymer matrix formed of a plurality of cross-linked polymer molecules; a plurality of droplets of liquid crystals within the polymer matrix; and a planar macrocycle dye dispersed within the plurality of droplets of liquid crystals. The planar macrocycle dye can include one or more of a phthalocanine, a porphyrin, a naphthalocyanine, a metallophthalocyanine, a metalloporphyrin, or a metallonaphthalocyanine. For example, the planar macrocycle dye is zinc phthalocyanine.

The planar macrocycle dye may be from 0.002 to 0.5 wt % of a mixture of the polymer matrix, the liquid crystals, and the planar macrocycle dye.

The modulator material layer can be a NCAP film. The modulator material layer also can be a PDLC film, a chiral liquid crystal film, a ferroelectric liquid crystal film, or a Blue Phase liquid crystal film.

The liquid crystals can be randomly oriented within the plurality of droplets when no electric field is present. The liquid crystals can at least partially align along a direction of an electric field when the electric field is applied across the modulator material layer.

A method is provided in a third embodiment. The method includes obtaining an emulsion by mixing water, liquid crystals, a planar macrocycle dye, and a plurality of hydrophilic polymer molecules. The emulsion is coated onto a substrate. The emulsion is then dried. The emulsion forms a modulator material layer including a polymer matrix formed of a plurality of cross-linked polymer molecules; a plurality of droplets of the liquid crystals within the polymer matrix; and the planar macrocycle dye dispersed within the plurality of droplets of liquid crystals. The planar macrocycle dye can include one or more of a phthalocanine, a porphyrin, a naphthalocyanine, a metallophthalocyanine, a metalloporphyrin, or a metallonaphthalocyanine.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein uses doping planar macrocycle dyes in NCAP films or other films in electro-optic modulators that are used in an array checker modulator technology to enhance the contrast ratio between the off/on state in the film. Thus, the NCAP films or other films can be doped with the planar macroscopic dyes by dispersing the planar macroscopic dyes in the liquid crystal droplets. This will improve the signal to noise ratio (SNR) and enhance the sensitivity of the modulator to detect defects in flat panel displays. Thus, detection capability of NCAP films or other films used in array checker modulator technology will be improved by the addition of the macrocycle planar dyes. The electro-optic modulator may be a component of an imaging system, also referred to as an automated optical inspection (AOI) system, a voltage imaging optical system (VIOS), an array checker, or the like.

A method of manufacturing the electro-optic modulator also is described. Embodiments of the electro-optic modulator include first coating a plastic sheet (such as Mylar) having transparent conductive layer with an NCAP film or other film. A second layer of plastic sheet is added (with or without conductive layer). This sandwiched structure is then laminated on the glass substrate by using optical adhesive. The top plastic sheet of the liquid crystal (LC)/polymer sandwich is then peeled off and discarded. A dielectric mirror film (or pellicle) is formed on plastic sheet, and then added to the assembly stack.

U.S. Pat. No. 7,817,333, titled "Modulator with improved sensitivity and life time," filed on Feb. 6, 2007; U.S. Pat. No. 8,801,964, titled "Encapsulated polymer network liquid crystal material, device and applications," filed on Dec. 22, 2010; and U.S. Pat. No. 7,639,319, titled "Polymer dispersed liquid crystal formulations for modulator fabrication," filed on Apr. 7, 2005 are each incorporated herein by reference in their entireties.

Figure 1:
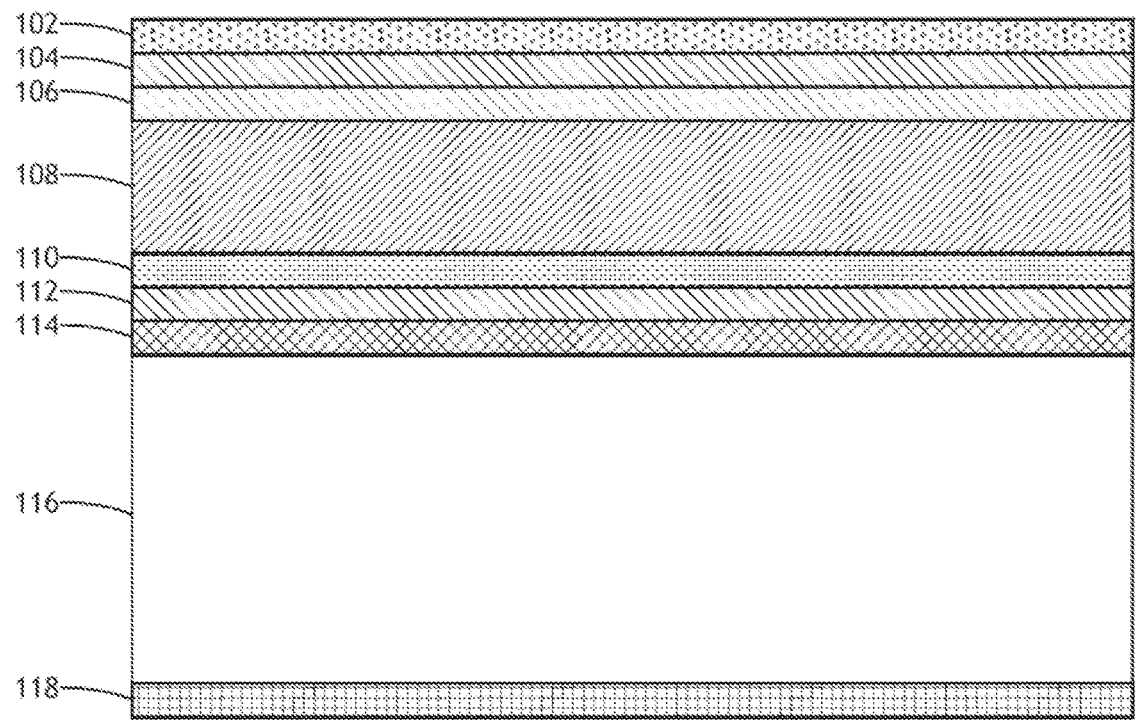
FIG. 1 is a cross-sectional view of an electro-optic modulator in accordance with an embodiment of the present disclosure.

FIG. 1 is a cross-section view of an electro-optic modulator 100. The electro-optic modulator 100 may include one or more films, layers, or coatings. The one or more film layers selectively permit the transmissivity of light. For example, the electro-optic modulator 100 may include one or more of a hard coating layer 102, plastic film 104, dielectric mirror film 106, modulator material layer 108, transparent conductive layer 110, plastic film 112, optical adhesive 114, glass substrate 116, and/or anti-reflective coating 118. Other films, layers, or coatings besides those illustrated or described with the electro-optic modulator 100 are possible.

The modulator material layer 108 (also referred to as a sensor layer, liquid crystal layer, polymer matrix layer, or the like) may be applied onto the glass substrate 116 by a number of methods, such as, but not limited to, by direct coating or lamination. Embodiments made with a lamination process include first coating the plastic film 112 (e.g., polyethylene terephthalate (PET), also known as Mylar) having the transparent conductive layer 110 with the modulator material layer 108. The transparent conductive layer 110 may generally include any material which is optically transparent and conductive to act as an electrode, such as, but not limited to, indium tin oxide (ITO) or another conductive material. The modulator material layer 108 may include a nematic curvilinear aligned phase (NCAP) mixture, a polymer dispersed liquid crystal (PDLC) mixture, or other mixture. The plastic film 112, and similarly the transparent conductive layer 110 and the modulator material layer 108, may be laminated on the glass substrate 116 by the optical adhesive 114. The dielectric mirror film 106 (or pellicle) may be formed on the plastic film 104, and then added to the modulator material layer 108 of the assembly stack. In embodiments, a vacuum assisted attachment process is used. The anti-reflective coating 118 may be applied to the bottom surface of a glass substrate 116. Similarly, the hard coating layer 102 may be cured to the plastic film 104. The hard coating layer 102 may include a major hard coating and a thinner slip agent layer.

Light transmission through the modulator material layer 108 may change in accordance with a magnitude of an electric field applied to the liquid crystal droplets of the modulator material layer 108. The transparent conductive layer 110 may capacitively couple with a sample to induce a localized voltage and an electric field. The localized voltage may generate the electric field. The electric field causes the liquid crystals in the modulator material layer 108 to align in the direction of the electric field.

Figure 2:
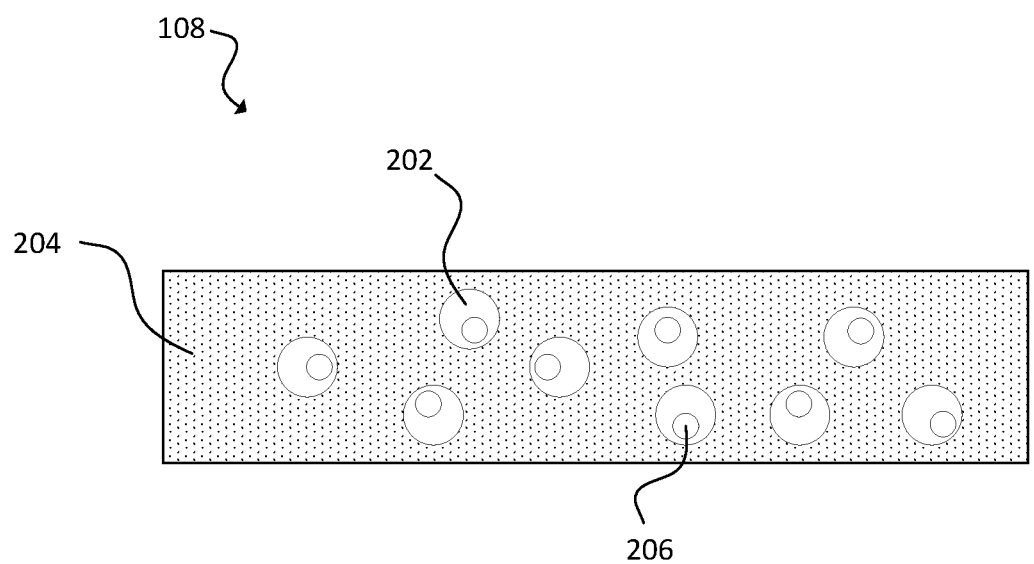
FIG. 2 illustrates a view of a modulator material layer of an electro-optic modulator, the material layer including droplets of liquid crystal with a planar macrocycle dye dispersed within the droplets of liquid crystals in accordance with an embodiment of the present disclosure.

FIG. 2 is a cross-section view of the modulator material layer 108. In an instance, the modulator material layer 108 includes an NCAP mixture, but other mixtures are possible. The modulator material layer 108 includes droplets 202 of liquid crystals suspended in a polymer matrix 204. The modulator material layer 108 include a diluent of one or more materials, such as a planar macrocycle dye 206 dispersed within the droplets 202. The planar macrocycle dye 206 will be described further herein.

The NCAP used in the modulator material layer 108 includes the droplets 202. The droplets 202 each include several liquid crystal molecules. The liquid crystal molecules have a temperature transition in the liquid crystal phase. In some embodiments, the droplets 202 are from about one to five microns in size. The liquid crystal droplets may include a liquid crystal temperature range. The liquid crystal temperature range refers to the temperature at which the liquid crystal is in a liquid crystal phase (e.g., between the crystal phase and the liquid phase).

The droplets 202 of liquid crystal may include any liquid crystal material. For example, the liquid crystal may include, but is not limited to, one or more of a nematic liquid crystal, a polymer dispersed liquid crystal, a chiral liquid crystal, a ferroelectric liquid crystal, a Blue Phase liquid crystal, a mixture of liquid crystal and dichroic dye, a cholesteric liquid crystal, or the like. The liquid crystal material can be substantially hydrophobic such that droplets 202 of the liquid crystal material can be formed with the emulsion.

The modulator material layer 108 also includes the polymer matrix 204. The polymer matrix 204 may include any polymer matrix material. For example, the polymer matrix material may include, but is not limited to, one or more water-based polymers, such as poly vinyl alcohol (PVA) a urethane (e.g., polyurethane), an acrylate (e.g., polyacrylate, fluorinated acrylate, silicone acrylate), or a water-based latex. Surface-activation agents may be used to formulate the polymer matrix 204.

The amount of polymer matrix 204 material may correspond to the strength and rigidity of the sensor material. The weight ratio of liquid crystal material to polymer matrix material can be within a range from approximately 50/50 to approximately 80/20, for example. The increased amount of polymer matrix 204 material can increase the strength of the sensor material and the operating voltage.

The polymer matrix 204 is located around the droplets 202 and contains the droplets 202 with the polymer matrix 204. The droplets 202 are then dispersed within the polymer matrix 204. The droplets 202 with liquid crystal molecules may anchor to the polymer matrix 204. In an embodiment, the degree of anchoring depends on the chemistry of the liquid crystal molecule and polymer matrix 204.

The liquid crystal molecules may be randomly oriented within the droplet 202 when no electric field is present. The liquid crystals may at least partially align along the electric field direction when the electric field is applied across the modulator material layer 108. For such alignment to occur, the molecules overcome the anchoring and/or friction with the polymer matrix 204 at the attachment locus. The orientation of the liquid crystals then changes the transmissivity of the modulator material layer 108. For example, the modulator material layer 108 may be opaque when no voltage is applied and the liquid crystals are randomly oriented. The modulator material layer 108 may be transparent or translucent when voltage is applied, and the liquid crystal molecules at least partially align. The liquid crystals then return to the random orientation when the electric field is removed.

The droplets 202 of liquid crystal may include a switching voltage. An intrinsic switching voltage of the liquid crystals may correspond to a voltage across the modulator material layer at which light transmission through electro-optic modulator has a maximum sensitivity to changes in the voltage. In many embodiments, the switching voltage corresponds to the electric field strength at which about half of the liquid crystal molecules are substantially aligned with the electric field. For best sensitivity, the goal is to invoke the largest change in transmission for the smallest voltage change possible. The sensitivity can be improved by reducing the intrinsic switching voltage of the liquid crystal material. The operating voltage and sensitivity of liquid crystal materials may be related to one or more factors, such as, but not limited to, properties of the liquid crystal, properties of the polymer matrix, a liquid crystal droplet size distribution in the polymer matrix, and/or interface properties between the polymer matrix the liquid crystal.

Anchoring of the liquid crystal molecules to the polymer matrix 204 can increase the intrinsic operating voltage of the modulator material layer 108. Frictional forces can comprise anchoring forces that may be associated with static friction of the liquid crystal molecules to the polymer matrix and may also comprise dynamic friction associated with relative motion between the liquid crystal molecules and the polymer matrix. As friction may affect the speed at which molecules move in relation to the surrounding polymer matrix, decreased friction may increase the switching speed of the liquid crystal molecules. As an increase in voltage may be required to overcome anchoring of the liquid crystal molecules to the polymer matrix, increased anchoring may be related to an increased intrinsic operating voltage of the modulator material layer 108. Thus, the lower the frictional force and/or anchoring between the droplets 202 of liquid crystal and the polymer matrix 204, the lower the driving voltage required to switch the liquid crystal molecules and/or liquid crystals from a substantially unaligned condition to a condition substantially aligned with the electric field.

A planar macrocycle dye 206 is dispersed within the droplets 202 of liquid crystal. The planar macrocycle dye 206 can include, consist of, or consist essentially of, for example, one or more of a phthalocyanine, a porphyrin, or a naphthalocyanine. The planar macrocycle dye 206 also can include, consist of, or consist essentially of, for example, one or more of the metallic analogs of these species, such as a metallophthalocyanine, a metalloporphyrin, or a metallonaphthalocyanine.

Typically, the metallophthalocyanines, metalloporphyrins, or metallonaphthalocyanines include a metal with charge +2 or +3. The metals can include copper, zinc, platinum, iron, cobalt, or tin, but other metals may be used.

A phthalocyanine is an organic compound that is aromatic and with a macrocylic structure that can have the formula $(C_8H_4N_2)_4H_2$. Metal complexing of phtalocyanines creates metallophtalocyanine compounds. Some metal complex examples of phtalocyanines that can be used are copper, cobalt, zinc, etc. Examples of phtalocyanines that can be used in accordance with the present disclosure are presented below, but other phtalocyanines are possible.

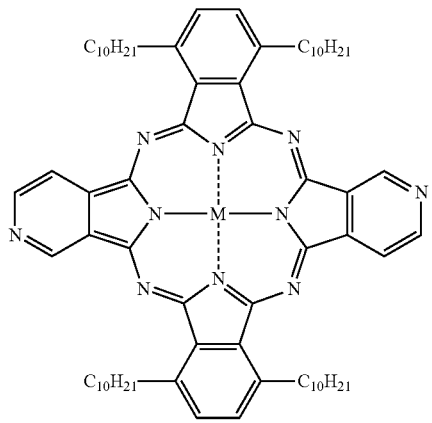

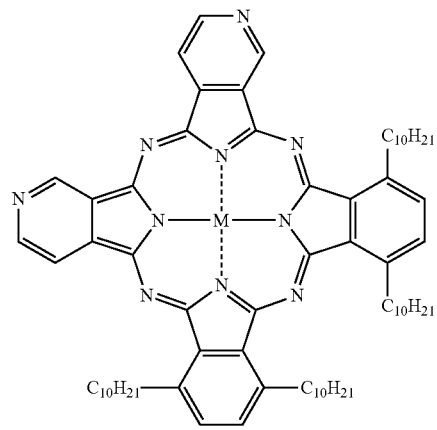

Examples of porphyrin that can be used in accordance with the present disclosure (protoporphyrin, IX, octaethylporphyrin, and tetraphenylporphyrin) are presented below, but other porphyrins are possible.

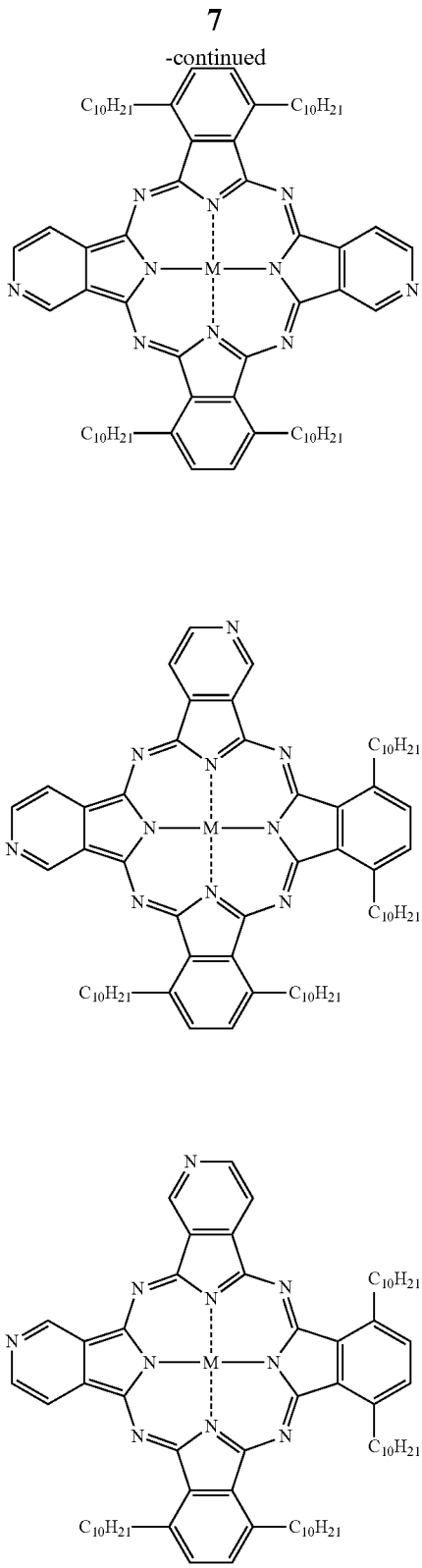

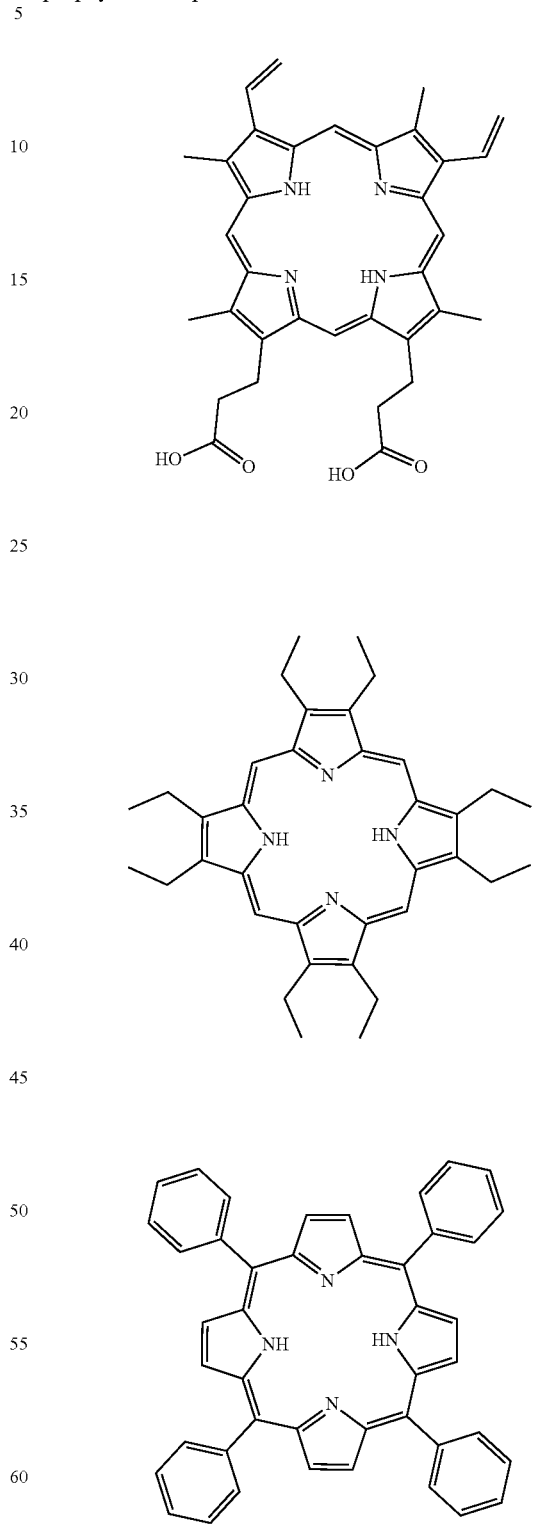

In an instance, the planar macrocycle dye 206 is zinc phthalocyanine.

A porphyrin is a heterocyclic macrocycle organic compound with four modified pyrrole subunits interconnected at their α carbon atoms via methine bridges (=CH—). Porphyrins can bind metals as well. Porphyrins can include different tails connected to the outset aromatic rings.

A naphthalocyanine is a cross-shaped organic molecule with the formula $C_{48}H_{26}N_8$. It is a derivative of phthalocyanine. An exemplary derivative is presented below, but other derivatives may be possible.

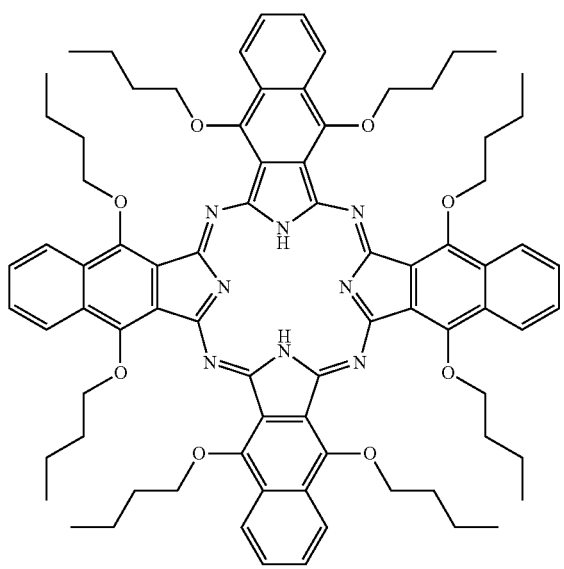 [SMILES: CCCCOc1c2c(c(OCCCC)c3ccccc13)-c1nc-2nc2[nH]c(nc3nc(nc4[nH]c(n1)c1c(OCCCC)c5ccccc5c(OCCCC)c41)-c1c-3c(OCCCC)c3ccccc3c1OCCCC)c1c(OCCCC)c3ccccc3c(OCCCC)c21]

Use of the planar macrocycle dye 206 can enhance optical contrast of materials in an NCAP film, PDLC film, or other film. When embedded in the droplets 202 of liquid crystal, the planar macrocycle dye 206 darkens the "off" state of the NCAP films or other films in certain wavelength ranges of illumination without appreciably altering the on-state transmission, which enhances the contrast ratio. When implemented in an electro-optical modulator used in array checker technology, the planar macrocycle dye 206 enhances the sensitivity of the modulator's NCAP film or other film to detect defects present in flat panel displays during the panels' manufacturing process.

The planar macrocycle dye 206 can have a weight percentage of 0.002 to 0.5 wt % relative to the liquid crystal mixture, which can include the polymer matrix, the liquid crystals, and the planar macrocycle dye. For example, the weight percentage may be 0.03% relative to the liquid crystal mixture. Dye concentrations may vary depending on solubility and chemical affinity with distinct liquid crystal materials. For example, the weight percentage may be from 0.03 to 0.1 wt % of the liquid crystal mixture to provide optimal solubility in the liquid crystal mixture. If the planar macrocycle dye 206 has a weight percentage below 0.002 wt %, then the contrast ratio between the off/on state in the film may not be enhanced. If the planar macrocycle dye 206 has a weight percentage above 0.5 wt %, then precipitation may occur.

Figure 3:
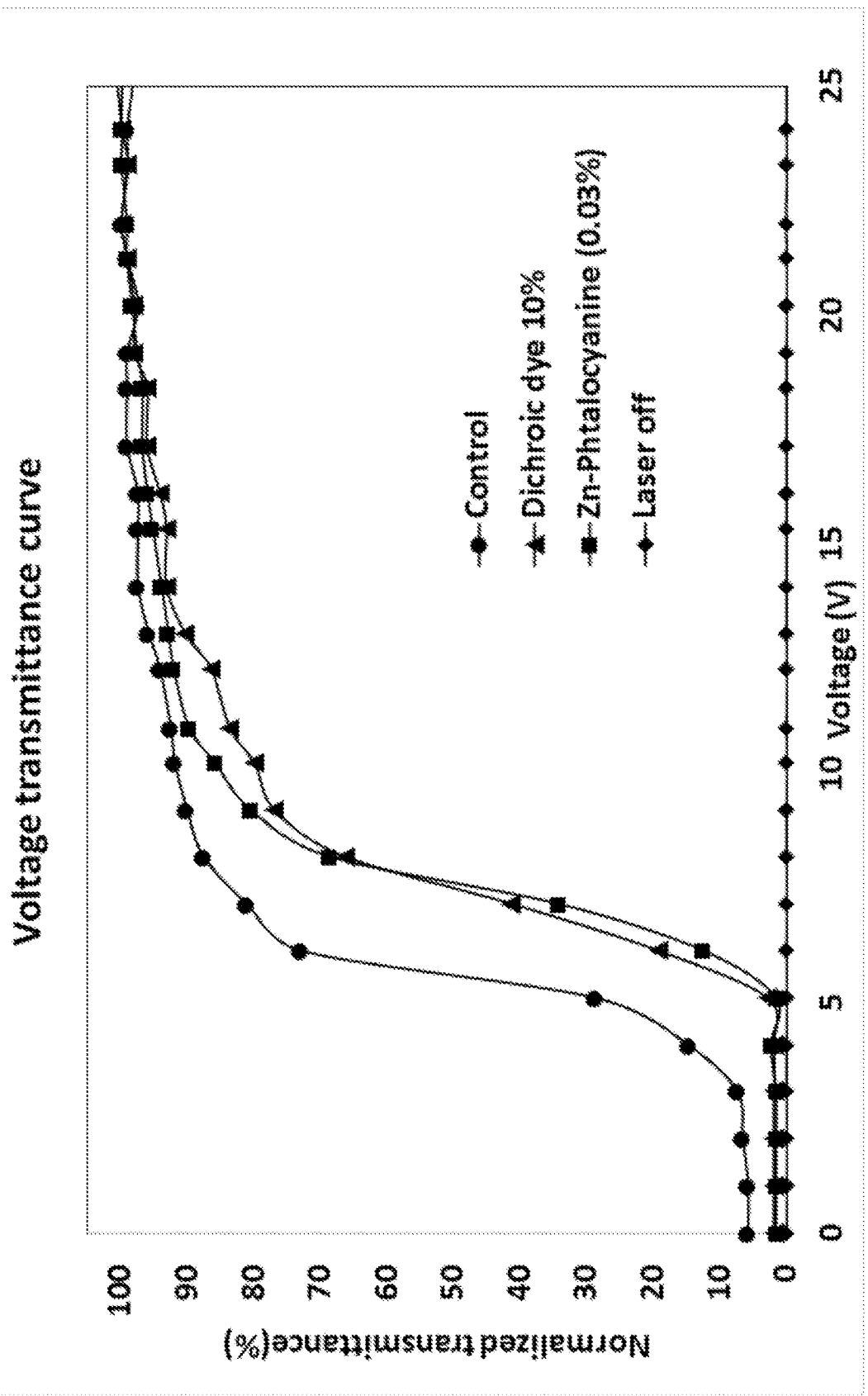
FIG. 3 is a chart showing experimental voltage transmission curves.

FIG. 3 is a chart showing experimental voltage transmission curves. As shown in FIG. 3, approximately 10 wt % of a standard dichroic dye was needed to obtain the same performance as 0.03 wt % of zinc phthalocyanine.

Figure 4:
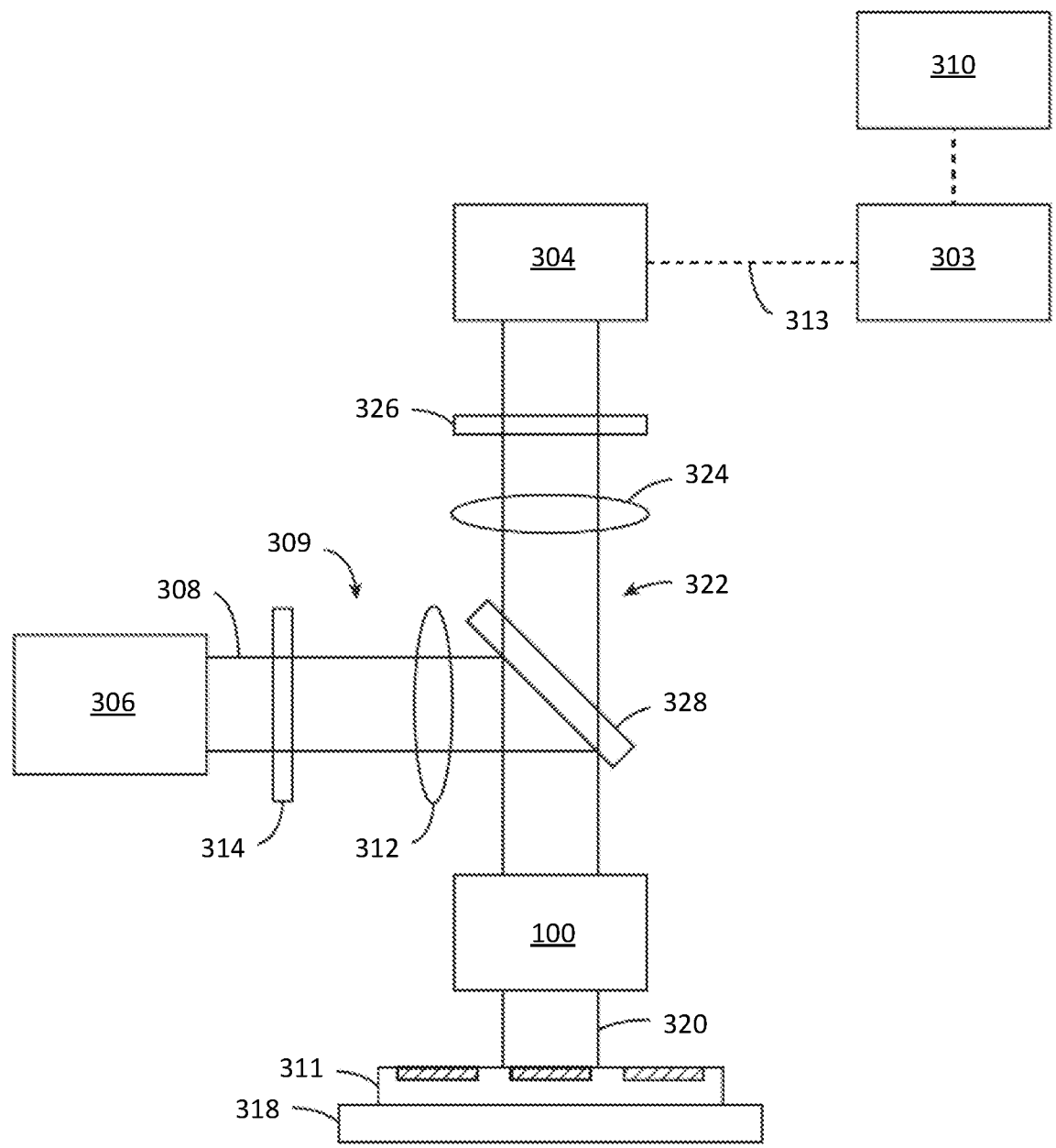
FIG. 4 illustrates a diagram of an imaging system in accordance with the present disclosure.

FIG. 4 is a conceptual view illustrating an imaging system 300. For the purposes of the present disclosure, the term "imaging system" is interchangeable with the term "imaging tool." The imaging system 300 may generally include any type of imaging tool suitable, such as, but not limited to, voltage imaging. Voltage imaging may be employed to detect and measure defects in flat panel thin film transistors (TFT) arrays. The performance of the TFT array is simulated as if it were assembled into a TFT cell and then the characteristics of the TFT array are measured by indirectly measuring actual voltage distribution on the panel, or so called voltage imaging, using an electro-optic modulator (e.g., electro-optic modulator 100). The voltage imaging may be performed by the imaging system 300. The imaging system 300 may include one or more components for checking such TFT arrays or other samples.

The electro-optic modulator 100 may be advantageous for a number of imaging tasks, such as to modulate a light source of the imaging system 300 to assist in detecting one or more defects of a sample 311, such as, but not limited to, TFT arrays, liquid crystal display (LCD) panels, OLED panels, and the like. The TFT arrays may be formed on a substrate, such as a clear plate of thin glass. The TFT arrays may include one or more printed layers. The printed layers may be formed on the substrate by a number of processes, such as, but not limited to, one or more material deposition steps, one or more lithography steps, one or more etching steps, or the like. The fabrication may occur in stages, where a material (e.g., indium tin oxide (ITO), etc.) is deposited over a previous layer or on the glass substrate, according to a process pattern. During fabrication, the printed layers are fabricated within selected tolerances to properly construct the final device. The printed layers may exhibit defects which are outside of the selected tolerances. Characteristics of the TFT array may be measured by the imaging system 300 to detect the defects.

In an embodiment, the imaging system 300 includes an illumination source 306 to generate illumination 308. The illumination 308 may include one or more selected wavelengths of light including, but not limited to, vacuum ultraviolet radiation (VUV), deep ultraviolet radiation (DUV), ultraviolet (UV) radiation, visible radiation, or infrared (IR) radiation. The illumination source 306 may further generate illumination 308 including any range of selected wavelengths. In embodiments, the illumination source 306 may include a spectrally-tunable illumination source to generate illumination 308 having a tunable spectrum.

The illumination source 306 can direct the illumination 308 to a sample 311 via an illumination pathway 309. The illumination pathway 309 may include one or more lenses 312 or additional illumination optical components 314 suitable for modifying and/or conditioning the illumination 308. For example, the one or more illumination optical components 314 may include, but are not limited to, one or more polarizers, one or more filters, one or more beam splitters, one or more diffusers, one or more homogenizers, one or more apodizers, one or more shapers, one or more shutters (e.g., mechanical shutters, electro-optical shutters, acousto-optical shutters, or the like), one or more aperture stops, and/or one or more field stops.

The imaging system 300 can include the electro-optic modulator 100. The electro-optic modulator 100 is disposed in a path of the illumination 308 from the illumination source 306. The electro-optic modulator 100 may modulate one or more characteristics of the illumination 308. During operation, light transmits through portions of the electro-optical modulator 100, and defects on or in the sample 311 can be detected by observing changes in the reflected or transmitted light. The electro-optic modulator 100 is separated from the sample 311 by an air gap. The electro-optic modulator 100 may be placed a select number of microns (e.g., between 5-75 microns) above the surface of the sample 311 (e.g., the TFT array), and a voltage bias is applied across a transparent electrode of a layer of indium tin oxide (hereinafter "ITO") on a surface of the electro-optic modulator 100. Thereupon, the electro-optic modulator 100 capacitively couples to the sample 311 so that an electric field associated with the sample 311 is sensed by one or more layers of the electro-optic modulator 100 (e.g., a layer including liquid crystals). The intensity of incident light transmitted through the liquid crystals of the electro-optic modulator are varied, (i.e., modulated), based on the electric field strength felt by the liquid crystals. For example, in areas where a normal pixel is located, a localized voltage potential is impressed (e.g., a capacitive coupling between the sample 311 and the electro-optic modulator 100) causing one or more films of the electro-optical modulator 100 to be locally translucent. In the locally translucent regions, light from the light source 306 is allowed to pass through the electro-optical modulator 100 and reflect from the sample 311, for passing through to a collection pathway 322 (e.g., for capture by detector 304). By way of another example, in areas where no voltage potential is impressed (e.g., no capacitive coupling), one or more films of the electro-optical modulator 100 remain locally opaque. In the case where the electro-optical modulator 100 is locally opaque, light from light source 306 is scattered or otherwise prevented from passing through to the sample 311. Thus, a transmission-voltage (T-V) curve may be determined by applying the voltage. The intrinsic switching voltage of the electro-optic modulator 100 may correspond to the voltage across the electro-optic modulator 100 at which light transmission through the electro-optic modulator 100 has a maximum sensitivity to a change in voltage. For example, the switching voltage may correspond to the electric field strength at which a given percentage of liquid crystal molecules are substantially aligned with the electric field allowing for the light transmission.

The sample 311 can include a TFT array. For example, the sample 311 may include pixel elements disposed between inactive regions. The sample stage 318 may include any device suitable for positioning the sample 311 within the imaging system 300.

A detector 304 can be configured to capture radiation emanating from the sample 311 (e.g., sample light 320) through a collection pathway 322. For example, the collection pathway 322 may include, but is not required to include, the electro-optic modulator 100, a collection lens (e.g., an objective lens), or one or more additional collection pathway lenses 324. In this regard, a detector 304 may receive radiation reflected or scattered (e.g., via specular reflection, diffuse reflection, and the like) from the sample 311 or generated by the sample 311 (e.g., luminescence associated with absorption of the illumination 308, or the like).

The system 300 may include, but is not limited to, a controller 303. The controller 303 may include one or more processors and memory, and may include or be coupled to a user interface 310.

The collection pathway 322 may further include any number of collection optical components 326 to direct and/or modify illumination collected by the electro-optic modulator 100 including, but not limited to one or more filters, one or more polarizers, or one or more blocks. Additionally, the collection pathway 322 may include field stops to control the spatial extent of the sample imaged onto the detector 304 or aperture stops to control the angular extent of illumination from the sample used to generate an image on the detector 304. In another embodiment, the collection pathway 322 includes an aperture stop located in a plane conjugate to the back focal plane of an optical element to provide telecentric imaging of the sample. In embodiments, the imaging system 300 includes a beam splitter 328 oriented such that the electro-optic modulator 100 may simultaneously direct the illumination 308 to the sample 311 and collect radiation emanating from the sample 311.

The detector 304 may include any type of optical detector suitable for measuring illumination received from the sample 311. For example, the detector 304 may include, but is not limited to, a charge-coupled device (CCD) detector, a time-delay integration (TDI) detector, a photomultiplier tube (PMT), an avalanche photodiode (APD), a complementary metal-oxide-semiconductor (CMOS) sensor, or the like. In another embodiment, the detector 304 may include a spectroscopic detector suitable for identifying wavelengths of light emanating from the sample 311.

The controller 303 can be communicatively coupled to a detector 304. The controller 303 may include one or more processors configured to execute any of various process steps. In embodiments, the controller 303 is configured to generate and provide one or more control signals configured to perform one or more adjustments to one or more process tools based on image signals 313 from the detector 304.

The one or more processors of the controller 303 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory). In one embodiment, the one or more processors may be embodied as a desktop computer, mainframe computer system, workstation, image computer, parallel processor, networked computer, or any other computer system configured to execute a program configured to operate or operate in conjunction with the imaging system 300, as described throughout the present disclosure. Moreover, different subsystems of the system 300 may include a processor or logic elements suitable for carrying out at least a portion of the steps described in the present disclosure. Therefore, the above description should not be interpreted as a limitation on the embodiments of the present disclosure but merely as an illustration. Further, the steps described throughout the present disclosure may be carried out by a single controller or, alternatively, multiple controllers. Additionally, the controller 303 may include one or more controllers housed in a common housing or within multiple housings. In this way, any controller or combination of controllers may be separately packaged as a module suitable for integration into imaging system 300. Further, the controller 303 may analyze data received from the detector 304 and feed the data to additional components within the imaging system 300 or external to the imaging system 300.

A memory medium may include any storage medium known in the art suitable for storing program instructions executable by the associated one or more processors. For example, the memory medium may include a non-transitory memory medium. By way of another example, the memory medium may include, but is not limited to, a read-only memory (ROM), a random-access memory (RAM), a magnetic or optical memory device (e.g., disk), a magnetic tape, a solid-state drive and the like. It is further noted that memory medium may be housed in a common controller housing with the one or more processors. In one embodiment, the memory medium may be located remotely with respect to the physical location of the one or more processors and controller 303. For instance, the one or more processors of controller 303 may access a remote memory (e.g., server), accessible through a network (e.g., internet, intranet and the like).

A user interface 310 can be communicatively coupled to the controller 303. The user interface 310 may include, but is not limited to, one or more desktops, laptops, tablets, and the like. In embodiments, the user interface 310 includes a display used to display data of the system 300 to a user. The display of the user interface 310 may include any display known in the art. For example, the display may include, but is not limited to, a liquid crystal display (LCD), an organic light-emitting diode (OLED) based display, or a cathode ray tube (CRT) display. Those skilled in the art should recognize that any display device capable of integration with a user interface 310 is suitable for implementation in the present disclosure. In embodiments, a user may input selections and/or instructions responsive to data displayed to the user via a user input device of the user interface 310.

Figure 5:
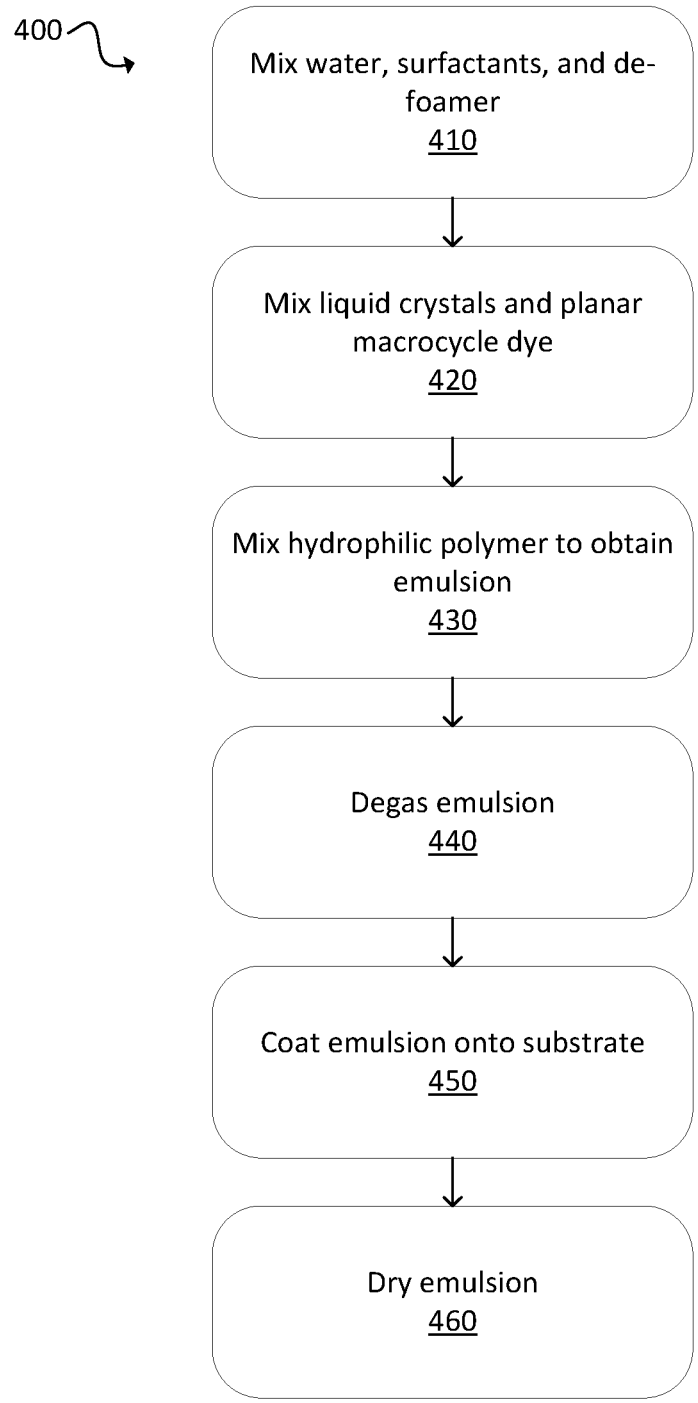
FIG. 5 is a flowchart of a method for making an electro-optic film in accordance with an embodiment of the present disclosure.

Referring now to FIG. 5, a flow diagram of a method 400 is described. The method may also be referred to as a process of manufacturing an electro-optic modulator. The embodiments and the enabling technologies described previously herein in the context of the electro-optic modulator 100 and the modulator material layer 108 should be interpreted to extend to the method 400. It is further noted, however, that the method is not limited to the architecture of the electro-optic modulator 100.

In a step 410, water, surfactants, and defoamer are mixed to form the surfactant mixture. The step may include the mixing for an extended duration (e.g., mixing overnight). The defoamer may include silica/mineral oil (e.g., surface treated silica) or the like.

In a step 420, the mixture is mixed with liquid crystal and at least one planar macrocycle dye 206. The mixture with the liquid crystal can be pre-mixed at a high speed and heat can be used. The mixture of the liquid crystal and the planar macrocycle dye may be mix with the solution prepared in step 410 at high speed or shear rate.

In a step 430, a hydrophilic polymer aqueous emulsion is then mixed with the mixture to obtain an emulsion containing droplets of liquid crystals. The hydrophilic polymer aqueous emulsion may include hydrophilic polyurethanes or the like. By emulsifying the liquid crystal material, an electrical performance of the liquid crystal material may be improved. The liquid crystal may form smaller droplets that are dispersed within the polymer material. The droplets of liquid crystals range in size between 0.1 to 10 microns and may include an average size 1 to 3 microns. The liquid crystal molecules may be randomly oriented within the droplet when no electric field is applied. The liquid crystal/polymer materials may be emulsified in any manner, such as, but not limited to, using a mechanical force by a high-speed blade. A crosslinker, such as poly-aziridine or carbodiimide based crosslinker, can be added at 0.05% to 3% range, followed by shaking by hand to mix it into the emulsion.

In a step 440, the emulsion is degassed. The emulsion is degassed under vacuum.

In a step 450, the emulsion is coated onto a substrate. The substrate may include an ITO-coated PET Mylar. For example, the substrate may include the transparent conductive layer 110 and the plastic film 112. Many wet coating methods can be used. Examples include wire wound rod, doctor blade, slot die, extrusion, spinning, spay, inkjet, etc.

In a step 460, the emulsion is dried. The emulsion may be dried at room temperature for a first duration and dried at an elevation temperature (e.g., in an oven at 40° C.) for a second duration. By drying, water in is evaporated from the mixture. Upon evaporation of the water, the droplets 202 of liquid crystal remains dispersed within the polymer matrix 204 and the polymer matrix is crosslinked. The dried emulsion forms the modulator material layer 108. The liquid crystal molecules may anchor to the polymer matrix. A degree of anchoring depends on the liquid crystal molecule, surfactant, and polymer chemistries. When an electric field is applied across the liquid crystal material, the liquid crystal molecules and/or droplets can at least partially align along the electric field direction. For such alignment to occur, the liquid crystal molecules and/or droplets overcome the anchoring and/or friction with the polymer at an attachment locus.

It is further contemplated that each of the embodiments of the method described above may include any other step(s) of any other method(s) described herein.

Although the planar macrocycle dyes have been described as being added to electro-optic modulators of imaging systems, this is not intended as a limitation of the present disclosure. It is further contemplated that the planar macrocycle dyes may be added to a number of aqueous based polymers. Such aqueous-based polymer may include a number of beneficial applications, such as, smart-window technology, sensors, or other NCAP liquid crystal films. In solvent-based systems, PDLC films, polymer stabilized liquid crystal (PSLC), polymer stabilized cholesteric liquid crystals (PSCLC), chiral liquid crystals, ferroelectric liquid crystals, or Blue Phase liquid crystal may be similarly improved.

An NCAP film may be suitable for making very large area light valves and displays. The NCAP film is generally water-based, and can be further divided into several subclasses. For example, a subclass of NCAP films includes a water-soluble polymer, such as polyvinyl alcohol (PVA) or a urethane. The water-soluble polymer may be moisture sensitive because of the hydrophilic property of the water-soluble polymer. The water-soluble polymer-based NCAP film may include a two-phase material that includes liquid crystal and a water/polymer solution. By way of another example, a subclass of NCAP films includes a latex-based material. The latex-based NCAP film may include a three-phase material that includes water, liquid crystal, and latex-based material. The latex-based material includes a water-insoluble polymer. Latex particles may be dispersed in water with the liquid crystal. These latex particles can "fuse" into continuous polymer phase that is irreversible once the water is removed. Some applications using this latex-based NCAP have long-term electro-optical stability. The liquid crystal is distributed within the polymer, either latex or the residual polymer such as PVA, after drying. Any of these NCAP films may benefit from the embodiments disclosed herein.

During the formation of the modulator material layer 108, one or more surfactants (e.g., wetting agents), may be added to the aqueous mixture. The surfactants may improve an ability of the modulator material layer 108 to spread, due to a reduced surface tension.

As used throughout the present disclosure, the term "sample" generally refers to a substrate formed of a semiconductor or non-semiconductor material (e.g., thin filmed glass or the like). For example, a semiconductor or non-semiconductor material may include, but is not limited to, monocrystalline silicon, gallium arsenide, indium phosphide, or a glass material. A sample may include one or more layers. For example, such layers may include, but are not limited to, a resist (including a photoresist), a dielectric material, a conductive material, and a semiconductive material. Many different types of such layers are known in the art, and the term sample as used herein is intended to encompass a sample on which all types of such layers may be formed. One or more layers formed on a sample may be patterned or un-patterned. For example, a sample may include a plurality of dies, each having repeatable patterned features. Formation and processing of such layers of material may ultimately result in completed devices. Many different types of devices may be formed on a sample, and the term sample as used herein is intended to encompass a sample on which any type of device known in the art is being fabricated. Further, for the purposes of the present disclosure, the term sample and wafer should be interpreted as interchangeable. In addition, for the purposes of the present disclosure, the terms patterning device, mask and reticle should be interpreted as interchangeable.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A modulator material layer comprising:
   a polymer matrix formed of a plurality of cross-linked polymer molecules;
   a plurality of droplets of liquid crystals within the polymer matrix; and
   a planar macrocycle dye dispersed within the plurality of droplets of liquid crystals.

2. The modulator material layer of claim 1, wherein the planar macrocycle dye includes one or more of a phthalocanine, a porphyrin, a naphthalocyanine, a metallophthalocyanine, a metalloporphyrin, or a metallonaphthalocyanine.

3. The modulator material layer of claim 2, wherein the planar macrocycle dye includes one or more of a phthalocanine, a porphyrin, or a naphthalocyanine.

4. The modulator material layer of claim 2, wherein the planar macrocycle dye includes one or more of a metallophthalocyanine, a metalloporphyrin, or a metallonaphthalocyanine.

5. The modulator material layer of claim 2, wherein the planar macrocycle dye is zinc phthalocyanine.

6. The modulator material layer of claim 1, wherein the planar macrocycle dye is from 0.002 to 0.5 wt % of a mixture of the polymer matrix, the liquid crystals, and the planar macrocycle dye.

7. The modulator material layer of claim 1, wherein the modulator material layer is a nematic curvilinear aligned phases (NCAP) film.

8. The modulator material layer of claim 1, wherein the modulator material layer is a polymer dispersed liquid crystal (PDLC) film, a chiral liquid crystal film, a ferroelectric liquid crystal film, or a Blue Phase liquid crystal film.

9. The modulator material layer of claim 1, wherein the droplets range in size from 0.1 to 10 microns.

10. The modulator material layer of claim 1, wherein the liquid crystals are randomly oriented within the plurality of droplets when no electric field is present, and wherein the liquid crystals at least partially align along a direction of an electric field when the electric field is applied across the modulator material layer.

11. The modulator material layer of claim 1, further comprising a transparent conductive film disposed on the modulator material layer.

12. The modulator material layer of claim 1, further comprising a glass substrate, wherein the modulator material layer is one of a direct coating on the glass substrate or a lamination on the glass substrate.

13. An imaging system comprising:
    an illumination source configured to generate illumination;
    a stage configured to hold a sample;
    a detector to generate an image of at least a portion of the sample; and
    an electro-optic modulator disposed in a path of illumination from the illumination source and separated from the sample by an air gap, wherein the electro-optic modulator includes:
    a transparent conductive film;
    a modulator material layer disposed on the transparent conductive film, the modulator material layer including:
      a polymer matrix formed of a plurality of cross-linked polymer molecules;
      a plurality of droplets of liquid crystals within the polymer matrix; and
      a planar macrocycle dye dispersed within the plurality of droplets of liquid crystals.

14. The imaging system of claim 13, wherein the planar macrocycle dye includes one or more of a phthalocanine, a porphyrin, a naphthalocyanine, a metallophthalocyanine, a metalloporphyrin, or a metallonaphthalocyanine.

15. The imaging system of claim 14, wherein the planar macrocycle dye is zinc phthalocyanine.

16. The imaging system of claim 13, wherein the planar macrocycle dye is from 0.002 to 0.5 wt % of a mixture of the polymer matrix, the liquid crystals, and the planar macrocycle dye.

17. The imaging system of claim 13, wherein the modulator material layer is a nematic curvilinear aligned phase (NCAP) film.

18. The imaging system of claim 13, wherein the modulator material layer is a polymer dispersed liquid crystal (PDLC) film, a chiral liquid crystal film, a ferroelectric liquid crystal film, or a Blue Phase liquid crystal film.

19. The imaging system of claim 13, wherein the liquid crystals are randomly oriented within the plurality of droplets when no electric field is present, and wherein the liquid crystals at least partially align along a direction of an electric field when the electric field is applied across the modulator material layer.

20. A method comprising:
    obtaining an emulsion by mixing water, liquid crystals, a planar macrocycle dye, and a plurality of hydrophilic polymer molecules;
    coating the emulsion onto a substrate; and
    drying the emulsion, wherein the emulsion forms a modulator material layer including:
      a polymer matrix formed of a plurality of cross-linked polymer molecules;
      a plurality of droplets of the liquid crystals within the polymer matrix; and
      the planar macrocycle dye dispersed within the plurality of droplets of liquid crystals, wherein the planar macrocycle dye includes one or more of a phthalocanine, a porphyrin, a naphthalocyanine, a metallophthalocyanine, a metalloporphyrin, or a metallonaphthalocyanine.

* * * * *